(12) United States Patent
Taskin et al.

(10) Patent No.: US 7,102,513 B1
(45) Date of Patent: Sep. 5, 2006

(54) AUTOMATIC INSTALLATION AND ALIGNMENT MODE FOR WIRELESS BRIDGES

(75) Inventors: Metin Ismail Taskin, Mountain View, CA (US); Arnold Mark Bilstad, Redwood City, CA (US); Glade L. Gauger, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 390 days.

(21) Appl. No.: 10/763,372

(22) Filed: Jan. 23, 2004

(51) Int. Cl.
*G08B 21/00* (2006.01)
*H04Q 7/20* (2006.01)
*G06F 15/16* (2006.01)

(52) U.S. Cl. ............ 340/540; 340/815.45; 340/825.72; 455/423; 455/115.3; 455/115.4; 455/157.2; 343/760; 709/220

(58) Field of Classification Search ................. 340/540
See application file for complete search history.

(56) References Cited

U.S. PATENT DOCUMENTS

| | | | | |
|---|---|---|---|---|
| 5,657,026 | A * | 8/1997 | Culpepper et al. | 342/374 |
| 5,740,366 | A * | 4/1998 | Mahany et al. | 709/227 |
| 6,016,108 | A * | 1/2000 | Terk et al. | 340/825.72 |
| 6,724,730 | B1 * | 4/2004 | Mlinarsky et al. | 370/241 |
| 2002/0103945 | A1 * | 8/2002 | Owen et al. | 710/10 |
| 2002/0196771 | A1 * | 12/2002 | Vij et al. | 370/349 |
| 2003/0050015 | A1 * | 3/2003 | Kelly et al. | 455/67.4 |
| 2003/0064718 | A1 * | 4/2003 | Haines et al. | 455/423 |
| 2005/0048963 | A1 * | 3/2005 | Kubler et al. | 455/423 |

OTHER PUBLICATIONS

"Release Notes for Cisco Aironet 1410 Bridges for Cisco IOS Release 12.2(11)JA", Jun. 2003, Copyright 2003 Cisco Systems, Inc.
"Release Notes for Cisco Aironet 1410 Bridges for Cisco IOS Release 12.2(11)JA1", Jul. 21, 2003, Copyright 2003 Cisco Systems, Inc.
"Release Notes for Cisco Aironet 1410 Bridges for Cisco IOS Release 12.2(11) JA2", Aug. 8, 2003, Copyright 2003 Cisco Systems, Inc.

* cited by examiner

*Primary Examiner*—Donnie L. Crosland
(74) *Attorney, Agent, or Firm*—Beyer Weaver & Thomas, LLP (57) ABSTRACT

Disclosed are methods and apparatus for automatically installing and/or aligning antennas of wireless bridges in computer networks. In general terms, when a particular bridge is installed or aligned, an installation mode is triggered which automatically displays an indication of one or more signal strength levels of signals received into the particular bridge. In the automatic installation mode, the particular bridge automatically searches for a remote bridge with which it can associate. After a remote bridge is associated with the particular bridge, the signal strength received by the particular bridge from the found bridge is then displayed on one or more indicators, such as light emitting diodes. Thus, one can then adjust the antenna of the bridge until an optimum power level is achieved without using any specialized equipment, such as a voltmeter or laptop for interfacing with the bridge to obtain the signal strength indication.

55 Claims, 5 Drawing Sheets

| State | Install/Align LED | Other 3 LED's |
|---|---|---|
| Power Off | Black | Black |
| Non-Root- not associated | Amber blink | Black |
| Non-Root-associated | Amber solid | Indicate RSSI <see Fig. 5> |
| Root- not associated | Green blink | Black |
| Root- associated | Green solid | Indicate RSSI <see Fig. 5> |
| Normal operation | Black | Normal |

Figure 4

| RSSI (dBm) | 1st LED | 2nd LED | 3rd LED |
|---|---|---|---|
| >-42 | Steady | Steady | Steady |
| -45 to -42 | FB | Steady | Steady |
| -48 to -42 | SB | Steady | Steady |
| -51 to -48 | VSB | Steady | Steady |
| -54 to -51 | Black | Steady | Steady |
| -57 to -54 | Black | FB | Steady |
| -60 to -57 | Black | SB | Steady |
| -63 to -60 | Black | VSB | Steady |
| -66 to -63 | Black | Black | Steady |
| -69 to -66 | Black | Black | FB |
| -72 to -69 | Black | Black | SB |
| -75 to -72 | Black | Black | VSB |
| < -75 | Black | Black | Black |
| Err >1 Assoc. | SB | SB | SB |

Legend:
VSB    Very Slow Blinking
SB    Slow Blinking
FB    Fast Blinking

AUTOMATIC INSTALLATION AND ALIGNMENT MODE FOR WIRELESS BRIDGES

BACKGROUND OF THE INVENTION

The present invention relates to methods and apparatus for facilitating use of wireless computer networks. More specifically, it relates to installing or aligning bridges in wireless networks.

A wireless network typically includes two or more processing nodes which communicate through their own respective bridge devices. That is, a first node is coupled to a first bridge and a second node is coupled to a second bridge. Each bridge is also configured to receive signals from the other bridge via an internal or external antenna. For example, a first node sends a signal through its own bridge, which then wirelessly transmits the signal to a second node's bridge. Each bridge generally process signals received and transmitted by their respective nodes.

When a wireless network is set up between two or more nodes located at two different sites, a bridge is installed at each site. At least part of the bridge is usually installed on the outside or roof of building at each site. Each antenna of each bridge needs to be manually adjusted to achieve an acceptable received signal strength. Some bridges may include a voltage port for measuring the received signal strength, some bridges may have a network port for interfacing with the bridge to obtain the received signal strength or some may have both. That is, each bridge provides a physical mechanism for accessing the received signal strength.

Unfortunately, current installation procedures present several disadvantages. For instance, a relatively skilled technician is needed to install the bridge, adjust the antenna, as well as physically interface with the bridge using a voltmeter or a laptop computer. That is, conventional installation procedures require that a technician transport special equipment to the physical installation site. The installation technician must also work with the specialized measurement equipment, in addition to physically manipulating the antenna of the bridge. Since wireless bridges are typically installed on building roofs, the installation procedure also presents a safety hazard when performing these various physical installation tasks together or it requires more than one person to complete the installation.

In view of the above, there is a need for improved mechanisms for installing wireless bridges. Additionally, automatic installation mechanisms which do not require the use of either specialized equipment or skilled technicians are needed.

SUMMARY OF THE INVENTION

Accordingly, the present invention provides methods and apparatus for automatically installing and/or aligning antennas of wireless bridges in computer networks. In general terms, when a particular bridge is installed or aligned, an installation mode is triggered which automatically displays an indication of one or more signal strength levels of signals received into the particular bridge. In the automatic installation mode, the particular bridge automatically searches for a remote bridge with which it can associate. After a remote bridge is associated with the particular bridge, the signal strength received by the particular bridge from the found bridge is then displayed. In one implementation, each bridge includes a set of light emitting diodes (LEDs) which are automatically used to indicate a power range of the one or more signals received into the bridge, e.g., from the associated other remote bridge. Thus, one can then adjust the antenna of the bridge until an optimum power level is achieved without using any specialized equipment, such as a voltmeter or laptop for interfacing with the bridge to obtain the signal strength indication.

In one embodiment, a method for installing or aligning a bridge for facilitating communication between nodes in a wireless computer network is disclosed. After a first bridge is turned on for the first time or reset to factory default settings, the following operations occur: (i) automatically searching for a second bridge to associate with the first bridge, (ii) automatically associating the first bridge with the second bridge when the second bridge is found, and (iii) automatically displaying on one or more indicators associated with the first bridge a signal strength of one or more signals received by the first bridge from the second bridge when the second bridge is associated with first bridge. For example, an average of a plurality of beacon or link test signals received from the second bridge are displayed. In one aspect, the searching, associating, and displaying operations (i) through (iii) are automatically performed without any configurations being set up by a user.

In a further aspect, the searching operation includes (i) searching for a master bridge for a predetermined time period, and (ii) when a master bridge is not found after the predetermined time period, the first bridge assumes the master role and periodic beacons are then sent on a selected channel so that a slave bridge can associate with the first bridge as its role as master bridge. In this example, the beacon indicates that the first bridge is being defined as a master. In one implementation, the one or more indicators display the signal strength of the signal received by the first bridge from the found master after the master is found or display the signal strength of the signal received by the first bridge from a slave that has associated with the first bridge. In yet another aspect, when a master is found, the first bridge is associated with the found master.

In one implementation, the signal strength is indicated by being displayed audibly by the one or more indicators associated with the first bridge. In yet another embodiment, the signal strength is indicated by being displayed visually by the one or more indicators. In a further aspect, the one or more indicators include one or more light emitting devices coupled to the first bridge. In one aspect, a different visual mode is displayed on the one or more indicators for different signal strength value ranges. The different visual modes include different combinations of at least (i) displaying a steady color, (ii) displaying a slow blinking color, and (iii) displaying a fast blinking color. The combinations may also include displaying a very slow and/or very fast blinking color.

In a further embodiment, the signal strength is also output on a port of the first bridge as a measurable parameter, such as a voltage. Additionally, when a network port of the first bridge is accessed by a processing node, the signal strength is also provided through such network port to the processing node.

In a specific implementation, searching for a master is only performed when the first bridge is not preconfigured as a master. When the first bridge is preconfigured as a master, periodic beacons are sent on a selected channel so that a slave can associate with the master bridge without waiting until after the predetermined time period for finding a master.

In a further embodiment, an antenna of the first bridge is adjusted until the indicated signal strength reaches a maximum value. In one aspect, the antenna is adjusted without using a measuring device to measure an output signal that is output from the first bridge or interfacing a processing device with the first bridge. In a specific implementation, a plurality of received signal strength values of signals sent by the second bridge to the first bridge are obtained and stored The indicated signal strength is an average of the plurality of received signal strengths. In one aspect, the indicated signal strength is displayed until an installation mode of the first bridge completes. In another aspect, the indicated signal strength is displayed until optimum indicated signal strength is reached.

In another embodiment, the invention pertains to a computer system operable to install or align a bridge for facilitating communication between nodes in a wireless computer network. The computer system includes one or more processors and one or more memory. At least one of the memory and processors are adapted to provide at least some of the above described method operations. In yet a further embodiment, the invention pertains to a computer program product for installing or aligning a bridge for facilitating communication between nodes in a wireless computer network. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
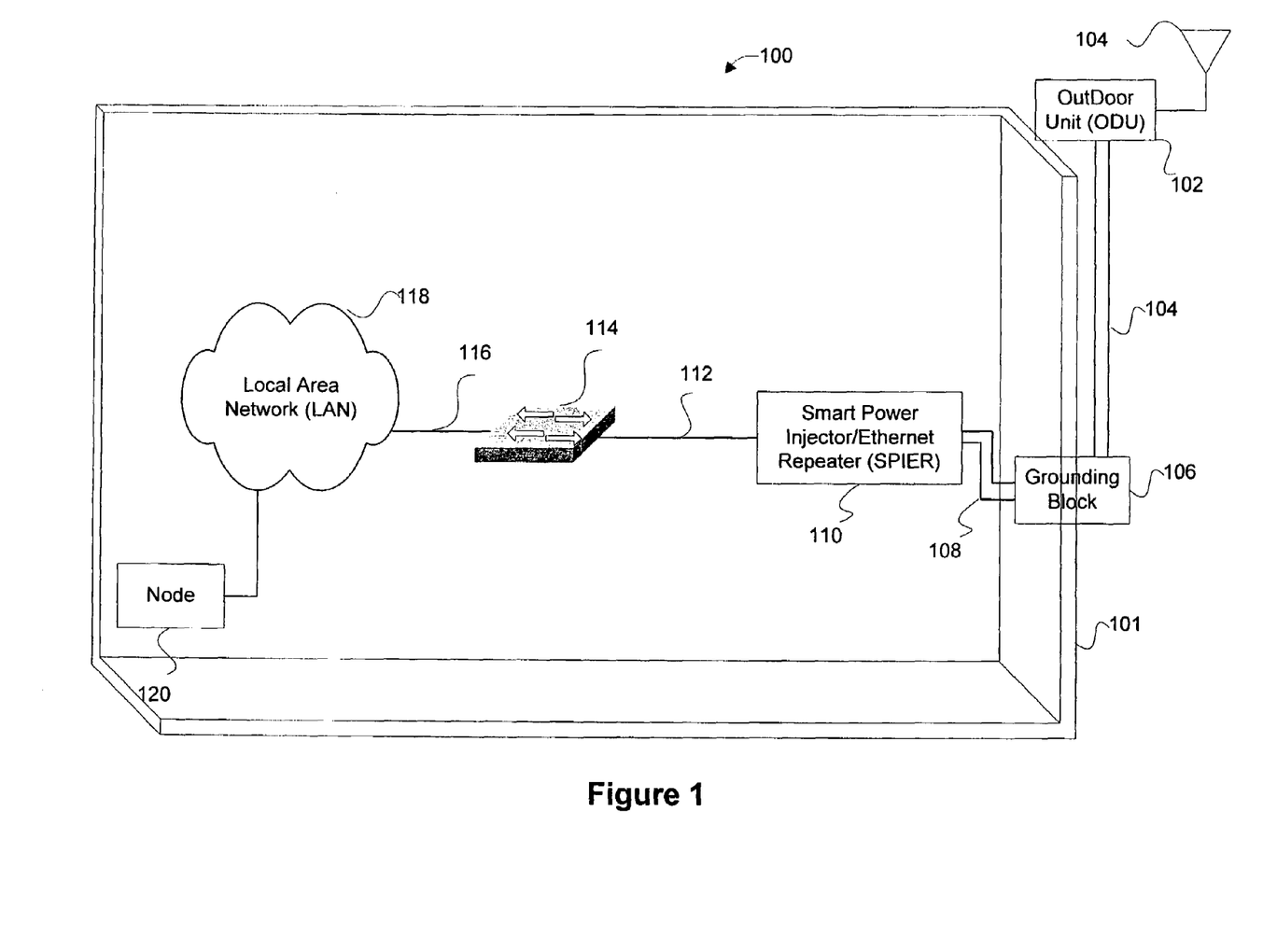
FIG. 1 is a diagrammatic representation of a bridge which is installed at a first location in accordance with one embodiment of the present invention.

FIG. 1 is a diagrammatic representation of a bridge which is installed at a first location 100 in accordance with one embodiment of the present invention. In general, a particular bridge includes an internal or external antenna for receiving and transmitting signals wirelessly between nodes on the bridge's network and other remote nodes which are on another network which is not coupled to the particular bridge. The bridge also includes or is coupled to a device for processing signals received by the antenna and for transmitting signals out from the antenna to another remote network.

In the illustrated configuration, an antenna 104 is coupled to an outdoor unit (ODU) 102 which is attached to the outside of a building 101. Alternatively, the ODU 102 may be located at a position detached from the building 101. An antenna and ODU 102 may also be positioned inside a building if an optimum received signal strength is obtainable.

The ODU 102 is typically coupled to a grounding block 106 through one or more coaxial cables 104. The ODU 102 generally receives and processes signals from the antenna 104, and the grounding block 106 generally provides grounding for coaxial cable 104 for lightning protection of the building 101. In one example, the grounding block 106 grounds the coaxial cable 104 shield to the building 101. As shown, the grounding block 106 is inserted through a wall of the building 101 to thereby couple the ODU 102 to a smart power injector/Ethernet repeater (SPIER) 110 via one or more coaxial cables 108.

The SPIER 110 generally receives a DC voltage input from a power adaptor (not shown) and injects that DC voltage into one or more coax cables 108 to power up the ODU 102. The SPIER also operates as an Ethernet repeater between the ODU 102 and internal LAN 118. In one implementation, SPIER 110 contains an unmanaged five port Ethernet switch chip. The chip includes both MAC and PHY layers. SPIER 110 receives Ethernet packets from the LAN interface, checks CRC and transmits the correctly received packets to the ODU 102 through the coaxial cable interface 108. Similarly packets received from the ODU interface are transmitted to the internal LAN 118 through a Cat5 cable interface 112. Of course, any suitable cables or wires may be utilized between the various components of the bridge and depends on the particular application. In one implementation, two coaxial cables are used, where one is used for received signals and the other is used for transmitted signals. SPIER 110 is then coupled to a router or switch 114 which forwards data to one or more nodes 120 of local area network (LAN) 118.

Although only a single node 120 is illustrated in FIG. 1, the LAN 118 may include any number of nodes having the same or different functions. For example a first node may be operable to provide an HTTP interface, while a second node is operable to provide an interface for managing the various components of the bridge, e.g., SPIER 110 and ODU 102.

The bridge may be defined as including any number of components for facilitating communication between a first network and another remote network (or plurality of networks). Although the term "bridge" is used herein interchangeably with the term "ODU", it should be understood that the bridge can include additional components, such as antenna 104, SPIER 110, grounding block 106, and router 114. Additionally, although the term "ODU" refers to an "outdoor unit", the bridge and its antenna may be placed inside a building in certain configurations.

Figure 2A:
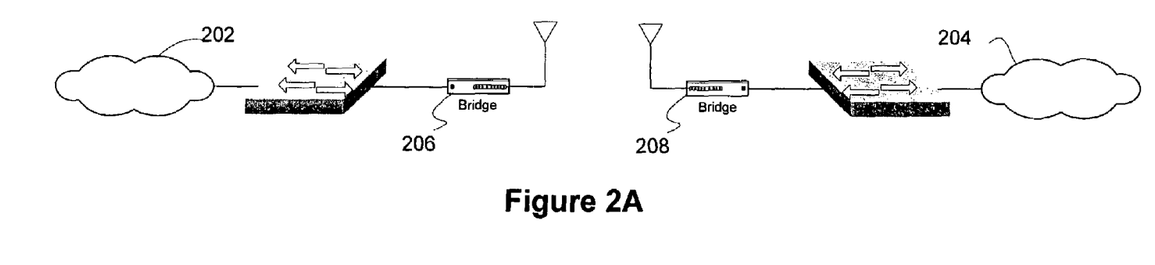
FIGS. 2A through 2C illustrate three example configurations that each include two or more bridges which allow communication between two or more nodes in a wireless computer network.
Figure 2B:
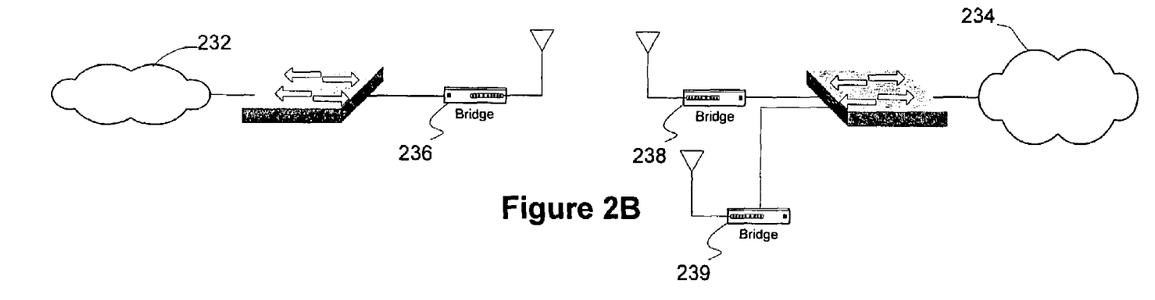
Figure 2C:
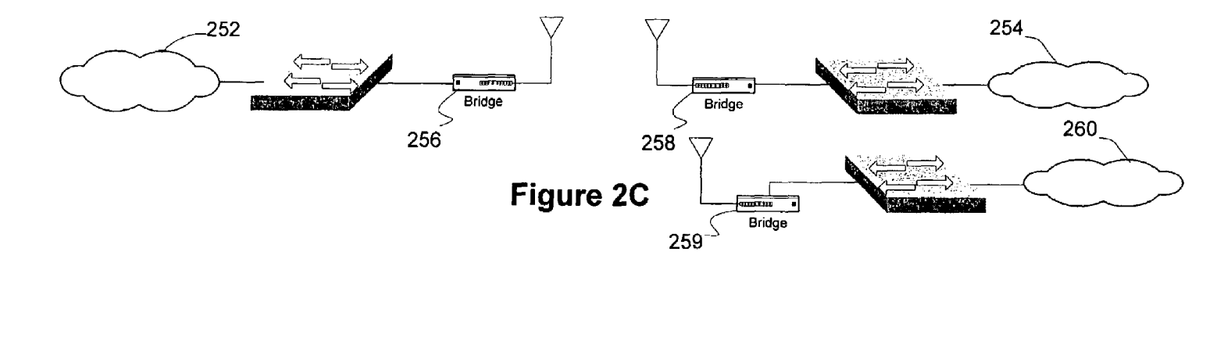

FIGS. 2A through 2C illustrate three example configurations that each include two or more bridges which allow communication between two or more nodes in a wireless computer network. These examples are not meant to limit the scope of the invention and are merely illustrative. There are numerous possible configurations using any number and type of bridges and associated networks (and nodes). Additionally, each node of a particular network may be at a fixed location or mobile.

FIG. 2A shows a first network 202 coupled to a first bridge 206. This first bridge 206 is configured to receive wireless data signals transmitted from a second network 204 which is itself coupled to a second bridge 208 and to transmit wireless data signals from the first network 202 to the second network 204. Likewise, the second bridge 208 is configured to receive wireless data signals from the first network 202 for the second network 208 and to transmit wireless data signals from the second network 208 to the first network 202. This example is typically referred to as a point-to-point (P2P) scheme.

The term network is used herein to refer to any number and type of processing nodes which are associated with a particular bridge. That is, each bridge can service a plurality of nodes or a single node.

FIG. 2B illustrates a first network 232 which communicates through a first bridge 236 with a second network 234 which has a redundant set of bridges 238 and 239. Of course, any number of redundant bridges may be utilized by any configuration of bridges and associated networks, besides a P2P type configuration. In the illustrated example, if one of the bridges 238 or 239 fails, the other bridge 238 or 239 then takes over facilitating communication between the second network 234 and the first network 232.

FIG. 2C illustrates a first network 252 having a first bridge 256 for communicating with two or more networks in a point-to-multi-point (P2 MP) scheme. The first network 252 may communicate via its own bridge 256 with network 254 via its bridge 258, as well as network 260 via its bridge 259.

In general, the present invention provides mechanisms for each bridge to automatically go into an installation mode when a bridge is first turned on or when an installed bridge is reset to a factory default setting. This installation mode may be automatically entered by a bridge without any further configuration being entered or set up by a user. When a particular bridge is in installation mode, a search is then automatically performed for another remote bridge with which the particular bridge can communicate. An indication of the received signal strength from the remote bridge is also displayed as a "received signal strength indication (or RSSI). The displayed RSSI may then be used by an person, such as a technician, to adjust the antenna direction of the bridge so as to achieve a maximum or optimum signal strength. This adjustment may be accomplished without utilizing any special equipment to measure a voltage or to interface with a network port of the bridge.

Figure 3A:
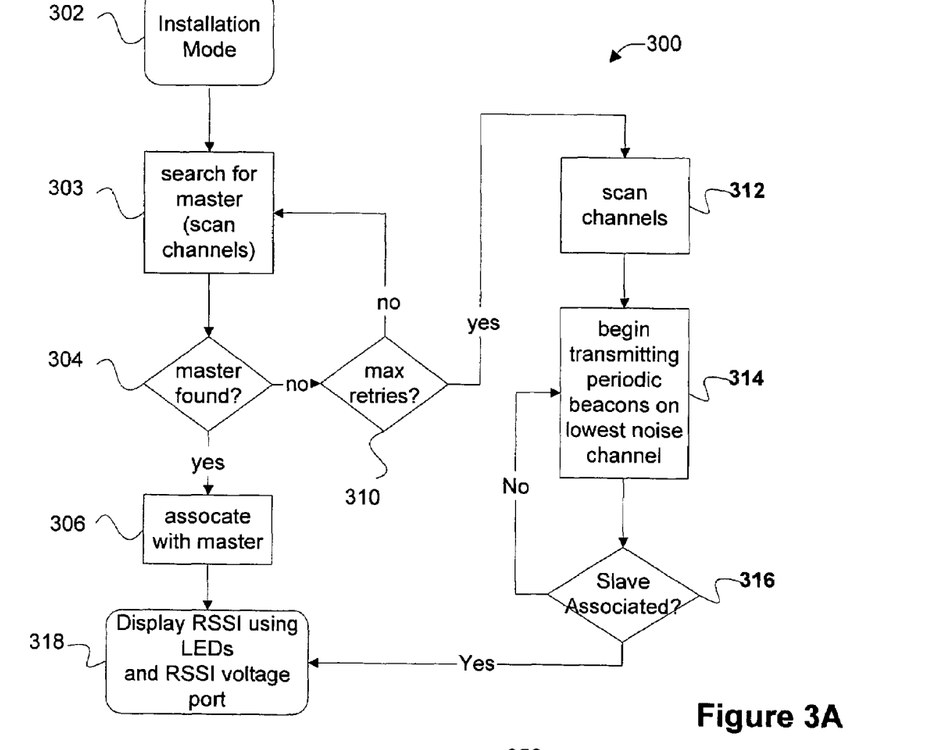
FIG. 3A is a flowchart illustrating a procedure for automatically installing or aligning a bridge in accordance with one embodiment of the present invention.

FIG. 3A is a flowchart illustrating a procedure 300 for automatically installing or aligning a bridge in accordance with one embodiment of the present invention. Initially, a bridge put into an installation mode in operation 302. The installation mode may be triggered in any number of ways for a particular bridge. By way of examples, a trigger may include newly installing and turning on the particular bridge for the first time, remotely configuring the bridge in the installation mode or simply resetting a previously installed bridge to its factory default settings e.g., via a "reset button" or the like. The phrase "installation mode" is used herein to encompass the techniques which are triggered by a power up of a new bridge and/or reset of an installed bridge to its factory default settings. In the following implementation, the techniques which occur during the installation mode include defining the bridge being installed (or aligned) as either a master or slave. However, these definitions are specific to the 802.11 IEEE standard and are not necessary to practice the techniques of the present invention. Although the powering up a new bridge or reset bridge to its factory default settings may be automatically defined as a slave or bridge in the following procedure, the bridge may also be pre-configured by a user as a slave or master. For instance, a user may interface with the ODU prior to installation through a network port of the ODU and send a configuration command to the ODU to define it as a slave or a master.

Referring back to FIG. 3A, after a power up or reset, a search is then performed for a master in operation 303. For example the available channels are scanned for a valid master signal. It is then determined whether a master is found in operation 304. A master may be located in any suitable manner and depends on the particular communication protocol used by the bridge. In one implementation which complies with the 802.11 IEEE standard, the bridge has four assigned channels, and each channel is scanned for beacons which is transmitted from the bridge's associated master. That is, the bridge tunes into each channel to search for the master. Any suitable number of channels may be utilized and depends on the particular implementation. Additionally, each channel may be delineated in any suitable manner, such as frequency or time division where each channel has an associated frequency range or time slot.

The beacon generally identifies the master. In one implementation, a bridge is defined as a master and thereby transmits periodic beacons when such bridge is the first to power up or when it is pre-configured to be a master. For instance, one may interface with a bridge's network port prior to installation and send a command to the bridge to be defined as a master. In an alternative embodiment, such a configuration may be manually set though one or more hardwire switches located on the bridge.

When using the 802.11 standard, the master of a particular service set transmits a particular service set ID (SSID). A unique SSID may be preconfigured in each bridge which is to belong to the same service set or communication network. That is, bridges which are to communicate together are given the same SSID. Thus, in this implementation the bridge which is powering up searches for beacons having the same preconfigured SSID as itself. When such a beacon is found by the powering up (or reset) bridge, the master has been found.

If a master is found, the newly installed or reset bridge is then associated with the found master and defined as a slave or non-root bridge with respect to the master or root bridge in operation 306. This association may include any suitable tasks for initiating communication between the slave and master. In one embodiment, the slave sends a link test signal, such as an Association Request to the master. The master will then approve or disapprove the Association Request. The master may, for example, authenticate the slave prior to sending an Authorization Response back to the slave. After a slave is associated with a master and the installation procedure ends, it is then authorized to communicate with such master, as well as any other slaves associated with such master.

If a master is not found in operation 304, it is then determined whether a predetermined maximum number of retries have been performed in operation 310. This operation may be accomplished in any suitable manner. For example, it may be determined whether a predetermined period of time has expired since the search for the master has commenced. If the maximum number of retries (e.g., predetermined period of time has not expired) has not been performed, the search for the master continues in operation 303.

If the master has not been found after a maximum number of retries (e.g., expiration of the predetermined time period), the current bridge is then defined as a master and beacons may then be sent on a selected channel. A remote slave can then associate with the master bridge. In other words, if a master is not found, the current bridge may be defined as the master and begin operating as a master. In one implementation, a plurality of channels are first scanned in operation 312. Periodic beacons are then transmitted on the lowest noise channel in operation 314. Alternatively, the beacons may automatically be transmitted on a specific channel without consideration of noise.

It is then determined whether a slave has associated with the master bridge in operation 316. A slave may associate with a master in a similar manner as described above, for example. Transmission of the beacon continues in operation 314 until a slave associates with the beacon. After a slave has associated with the beacon (or a master has been found with which to associate in operation 306), a received signal strength indication (RSSI) is then displayed audibly and/or visually, e.g., via a set of LEDs (light emitting diodes). The received signal strength level may also be output onto a RSSI voltage port as a measurable voltage in operation 318. In addition to outputting the RSSI onto a voltage port, the RSSI (voltage or power range) or absolute received voltage or power level value may be accessible by a remote processing node via a communication port of the ODU.

The RSSI generally indicates a signal strength of a signal received by the bridge from either a slave or a master. In one implementation, the RSSI is audibly displayed by one or more indicators, such as buzzers. In another implementation, the signal strength is indicated by being displayed visually by one or more indicators, such as light emitting diodes (LEDs) or other light devices.

Figure 3B:
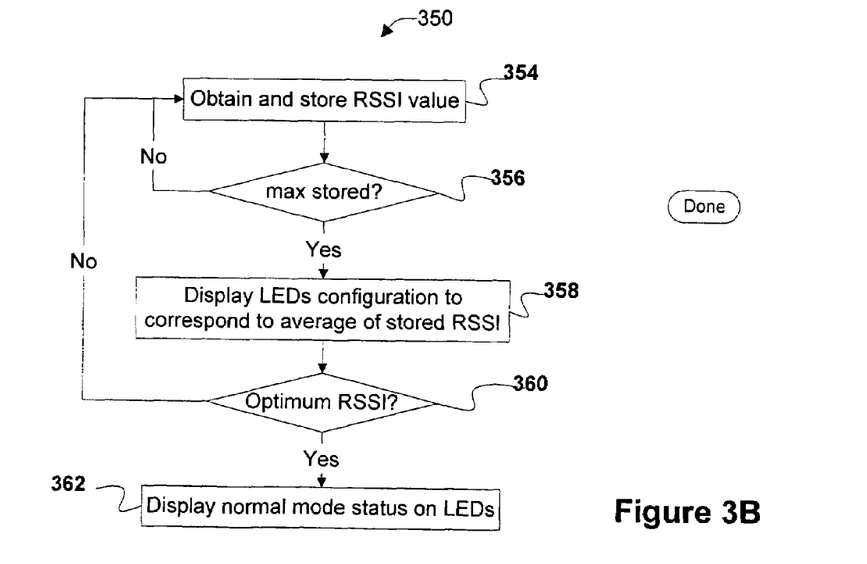
FIG. 3B is a flowchart illustrating a procedure for configuring a set of LED's during and after an installation mode of a bridge in accordance with one embodiment of the present invention.

FIG. 3B is a flowchart illustrating a procedure 350 for configuring a set of LED's during and after an installation mode of a bridge in accordance with one embodiment of the present invention. Although the RSSI is described as being displayed through a set of LEDs with respect to FIG. 3B, of course, any suitable type of display interface may be utilized. Initially, the RSSI value is obtained and stored in operation 354. Several mechanisms for obtaining and storing an RSSI value are described further below. It is then determined whether a maximum number of RSSI values have been obtained and stored in operation 356. In one implementation, an average RSSI value is to be indicated and displayed every 20 milliseconds on a set of LEDs. Thus, RSSI values are stored for 20 milliseconds (e.g., 1 per millisecond). Alternatively, the RSSI may simply be obtained every predetermined period of time and indicated and displayed on the set of LEDs.

As shown, after a suitable number of RSSI values have been obtained and stored, the LEDs are configured to indicate an average value of the plurality of stored RSSI values. After an RSSI (or average RSSI) is indicated on the set of LEDs, it is then determined whether an optimum RSSI value has been reached. An optimum RSSI value may be achieved in any suitable manner. In one implementation, one adjusts the antenna until the maximum obtainable RSSI is displayed for the specific location. In an alternative embodiment, the bridge automatically determines that the optimum RSSI has been reached. In one specific implementation, an optimum RSSI value means maximum obtainable RSSI value at a specific location. This optimum RSSI may be achieved by adjusting the antenna until the displayed RSSI indicator reaches the optimum RSSI value. Accordingly, the RSSI (or average RSSI) is repeatedly indicated through the LED's until the optimum RSSI is reached.

After the optimum RSSI is reached, antenna alignment can be completed. The bridge can be configured in a normal mode and normal mode activity or status may then be displayed on the LEDs in operation 362. For instance, one interfaces with the network port of the ODU and sends a command to exit the installation mode. In one specific embodiment which encourages one to not leave the bridge in an installation mode, the bridge does not handle normal communication traffic (besides the command to take the bridge out of the installation mode or to access the RSSI value via the network port) until the bridge is taken out of the installation mode. In an alternative embodiment, the bridge automatically leaves the installation mode when a peak RSSI is reached.

Figure 4:
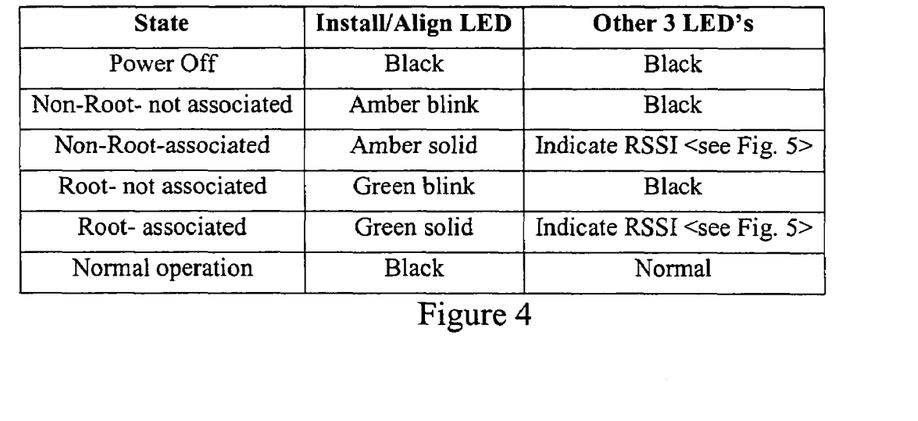
FIG. 4 is a table listing different color configurations for four LEDs and the corresponding states of the bridge in accordance with a specific implementation of the present invention

In one implementation, the ODU includes four LED's for indicating the RSSI during an installation mode and status of the ODU when the ODU is active and not in an installation mode. FIG. 4 is a table listing different color configurations for four LEDs and the corresponding states of the ODU in accordance with a specific implementation of the present invention. As shown, when the four LEDs are black, the ODU is powered off. In this example, the LED's include an "install/align" LED for indicating a mode of the ODU and three other LED's for indicating RSSI during the installation mode or status during a normal operation mode.

When the install/align LED is blinking an amber color and the other three LEDs are black, the ODU is currently searching for a master to which it will be a slave or non-root. When the install LED is a solid amber color, a master has been found for the current non-route or slave bridge and the RSSI of the found master is indicated by the other three LEDS as shown in FIG. 5.

When the three LEDs (for indicating an RSSI) are black and the install LED is blinking a green color, a master has not been found and the master or root ODU is currently looking for a slave with which to associate. When the install LED turns a solid green, a slave has associate with the current bridge master. The three LEDS are then used as shown in FIG. 5 to indicate the RSSI of an associated slave. After the installation mode completes (e.g., an optimum RSSI has been achieved) and the bridge is taken out of installation mode, the three LEDs are then used to indicate the status of the ODU and the install LED is black, e.g., for normal operation.

Figure 5:
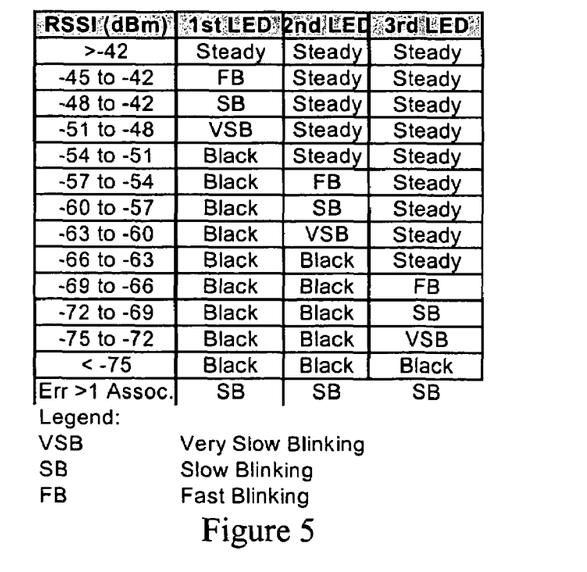
FIG. 5 is a table showing various configurations of the three installation mode LEDs for indicating an RSSI in units of dBm in accordance with a specific implementation of the present invention.

FIG. 5 is a table showing various configurations of the three LEDs for indicating an RSSI during an installation mode. The RSSI is indicated as a range of values in units of dBm. When all of the three LEDs have a steady color, the RSSI has a level greater than −42 dBm. When one of the LEDs is blinking, the rate of the blinking LED, as well as which LED is blinking, indicates a particular range of RSSI values. For instance, a fast blinking (FB) first LED and steady $2^{nd}$ and $3^{rd}$ LEDs indicate an RSSI between −45 and −42 dBm.

Generally, the techniques for installing or aligning a bridge of the present invention may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic or configured to interface with a network device.

Figure 6:
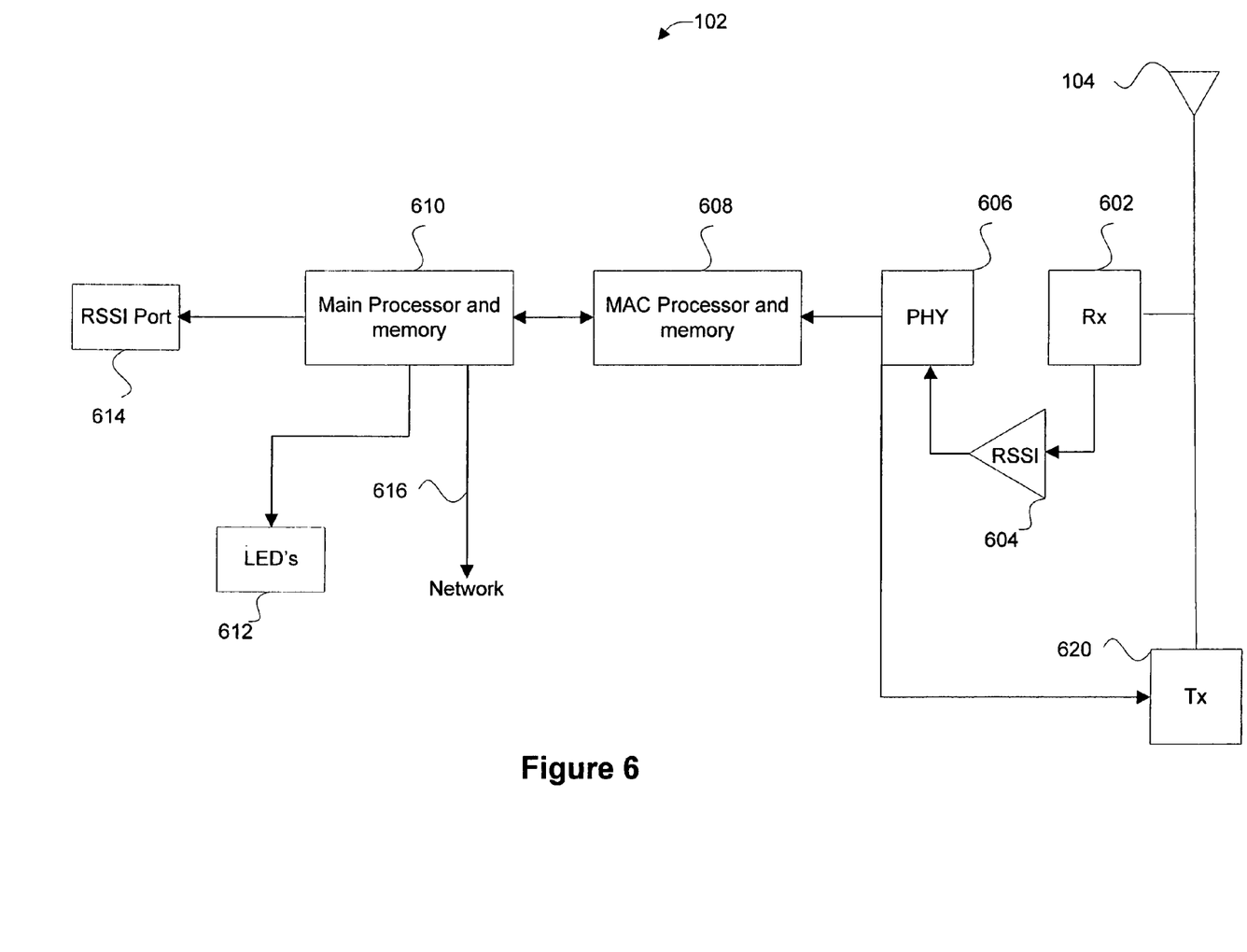
FIG. 6 is a diagrammatic representation of a bridge in accordance with one embodiment of the present invention.

FIG. 6 is a diagrammatic representation of a bridge (e.g., the ODU of FIG. 1) in accordance with one embodiment of the present invention. As shown, the antenna 104 receives a signal which is input to a receive (Rx) module 602. The Rx module generally processes the received signal by down-converting the received signal to a lower frequency. The received signal is then passed through an RSSI amplifier 604 for amplifying the received signal (and the RSSI value) and sending the amplified received signal to a PHY module 606. The PHY module 606 generally converts and demodulates the received signal to a digital signal and stores the RSSI value of the received signal. For example, the PHY module 606 includes an analog to digital (ADC) converter for converting the analog RSSI level to a digital value.

The PHY module 606 may send the digital RSSI value along with the received data to MAC processor and memory 608. The MAC processor and memory 608 are generally configured to store the RSSI value. This RSSI value may then be accessed by a main processor and memory 610. The main processor and memory 610 also acts to display an indication of the RSSI on LEDs 612. The main processor and memory 610 may be also configured to output a measurable value of the RSSI onto RSSI port 614. In one implementation, a voltage level of the RSSI is output to port 614. The main processor and memory 610 may also be configured to allow access to the RSSI through network port 616.

The bridge 102 also includes a transmit (Tx) module 620 for processing data to be transmitted through antenna 104. For example, the Tx module 620 receives signals which are to transmitted from PHY 606 and up-converts to the frequency used by the wireless network. The PHY 606 is likewise configured to modulate the signal to be transmitted.

One or more of the illustrated processor may include one or more processors, such as the IBM PowerPC family processors, Motorola family of microprocessors or the MIPS family of microprocessors. In an alternative embodiment, one or more of the processors are specially designed hardware for controlling the operations of bridge 102. In a specific embodiment, one or more memory (such as non-volatile RAM and/or ROM) also forms part of each processor. However, there are many different ways in which memory could be coupled to the system. Each memory block may be used for a variety of purposes such as, for example, caching and/or storing data, programming instructions, etc.

Although the system shown in FIG. 6 is one specific bridge 102 of the present invention, it is by no means the only bridge architecture on which the present invention can be implemented. For example, an architecture having a single processor that handles all the computational tasks may be used. Further, other types of interfaces and media could also be used with the bridge.

Regardless of bridge device's configuration, it may employ one or more memories or memory modules configured to store data, program instructions for the general-purpose network operations and/or the inventive techniques described herein. The program instructions may control the operation of an operating system and/or one or more applications, for example. The memory or memories may also be configured to store each obtained RSSI value, an SSID value, buffered data, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for installing or aligning a bridge for facilitating communication between nodes in a wireless computer network, the method comprising:

after a first bridge is turned on for the first time or reset to factory default settings, (i) automatically searching for a second bridge to associate with the first bridge, (ii) automatically associating the first bridge with the second bridge when the second bridge is found, and (iii) automatically displaying one or more indicators associated with the first bridge which indicate a signal strength of one or more signals received by the first bridge from the second bridge when the second bridge is associated with first bridge.

2. A method as recited in claim 1, wherein the searching, associating, and displaying operations (i) through (iii) are automatically performed without any configurations being set up by a user.

3. A method as recited in claim 1, wherein the searching includes:

searching for a master for a predetermined time period; and when a master is not found after the predetermined time period, sending periodic beacons on a selected channel so that a slave can associate with the first bridge, wherein each beacon indicates that the first bridge is being defined as a master.

4. A method as recited in claim 3, wherein the one or more indicators display the signal strength of the signal received by the first bridge from the found master after the master is found or display the signal strength of the signal received by the first bridge from a slave that has associated with the first bridge.

5. A method as recited in claim 3, further comprising when a master is found, associating the first bridge with the found master.

6. A method as recited in claim 1, wherein the signal strength is indicated by being displayed audibly by the one or more indicators associated with the first bridge.

7. A method as recited in claim 1, wherein the signal strength is indicated by being displayed visually by the one or more indicators.

8. A method as recited in claim 7, wherein the one or more indicators include one or more light emitting devices coupled to the first bridge.

9. A method as recited in claim 7, wherein a different visual mode is displayed on a plurality of indicators for different signal strength value ranges and the different visual modes include different combinations of at least (i) displaying a steady color, (ii) displaying a slow blinking color, and (iii) displaying a fast blinking color.

10. A method as recited in claim 7, wherein a different visual mode is displayed on a plurality of indicators for different signal strength value ranges and the different visual modes include different combinations of at least (i) displaying a steady color, (ii) displaying a very slow blinking color (iii) displaying a slow blinking color, and (iv) displaying a fast blinking color.

11. A method as recited in claim 1, further comprising outputting the signal strength on a port of the first bridge as a measurable parameter.

12. A method as recited in claim 11, further comprising when a network port of the first bridge is accessed by a processing node, providing the signal strength through such network port to the processing node.

13. A method as recited in claim 1, wherein the indicated signal strength is an average signal strength over a specified time period.

14. A method as recited in claim 3, wherein searching for a master is only performed when the first bridge is not preconfigured as a master, and wherein when the first bridge is preconfigured as a master, periodic beacons are sent on a selected channel so that a slave can associate with the first bridge without waiting until after the predetermined time period for finding a master.

15. A method as recited in claim 1, further comprising:
adjusting an antenna of the first bridge until the indicated signal strength reaches a maximum value.

16. A method as recited in claim 15, wherein the antenna is adjusted without using a measuring device to measure an output signal that is output from the first bridge or interfacing a processing device with the first bridge.

17. A method as recited in claim 1, further comprising:
obtaining and storing a plurality of received signal strength values of signals received from the second bridge by the first bridge,
wherein the indicated signal strength is an average of the plurality of received signal strengths.

18. A method as recited in claim 17, wherein the indicated signal strength is displayed until an installation mode of the first bridge completes.

19. A method as recited in claim 17, wherein the indicated signal strength is displayed until an optimum indicated signal strength is reached.

20. A method as recited in claim 18, further comprising preventing the passing of traffic through the bridge until the installation mode is exited.

21. A computer system operable to install or align a bridge for facilitating communication between nodes in a wireless computer network, the computer system comprising:
one or more processors;
one or more memory, wherein at least one of the processors and memory are adapted for:
after a first bridge is turned on for the first time or reset to factory default settings, (i) automatically searching for a second bridge to associate with the first bridge, (ii) automatically associating the first bridge with the second bridge when the second bridge is found, and (iii) automatically displaying one or more indicators associated with the first bridge which indicate a signal strength of one or more signals received by the first bridge from the second bridge when the second bridge is associated with first bridge.

22. A computer system as recited in claim 21, wherein the searching, associating, and displaying operations (i) through (iii) are automatically performed without any configurations being set up by a user.

23. A computer system as recited in claim 21, wherein the searching includes:
searching for a master for a predetermined time period; and
when a master is not found after the predetermined time period, sending periodic beacons on a selected channel so that a slave can associate with the first bridge, wherein each beacon indicates that the first bridge is being defined as a master.

24. A computer system as recited in claim 23, wherein the one or more indicators display the signal strength of the signal received by the first bridge from the found master after the master is found or display the signal strength of the signal received by the first bridge from a slave that has associated with the first bridge.

25. A computer system as recited in claim 23, wherein at least one of the processors and memory are further adapted for associating the first bridge with the found master when a master is found.

26. A computer system as recited in claim 21, wherein the signal strength is indicated by being displayed audibly by the one or more indicators associated with the first bridge.

27. A computer system as recited in claim 21, wherein the signal strength is indicated by being displayed visually by the one or more indicators.

28. A computer system as recited in claim 27, wherein the one or more indicators include one or more light emitting devices coupled to the first bridge.

29. A computer system as recited in claim 27, wherein a different visual mode is displayed on a plurality of indicators for different signal strength value ranges and the different visual modes include different combinations of at least (i) displaying a steady color, (i) displaying a slow blinking color, and (ii) displaying a fast blinking color.

30. A computer system as recited in claim 27, wherein a different visual mode is displayed on a plurality of indicators for different signal strength value ranges and the different visual modes include different combinations of at least (i)

displaying a steady color, (ii) displaying a very slow blinking color (iii) displaying a slow blinking color, and (iv) displaying a fast blinking color.

31. A computer system as recited in claim 21, wherein the indicated signal strength is an average signal strength over a specified time period.

32. A computer system as recited in claim 23, wherein searching for a master is only performed when the first bridge is not preconfigured as a master, and wherein when the first bridge is preconfigured as a master, beacons are sent on a selected channel so that a slave can associate with the first bridge without waiting until after the predetermined time period for finding a master.

33. A computer system as recited in claim 21, wherein at least one of the processors and memory are further adapted for:

obtaining and storing a plurality of received signal strength values of signals sent by the second bridge to the first bridge, wherein the indicated signal strength is an average of the plurality of received signal strengths.

34. A computer system as recited in claim 21, wherein the indicated signal strength is displayed until an installation mode of the first bridge completes.

35. A computer system as recited in claim 21, wherein the indicated signal strength is displayed until optimum indicated signal strength is reached.

36. A computer program product for installing or aligning a bridge for facilitating communication between nodes in a wireless computer network, the computer program product comprising:

at least one computer readable medium;

computer program instructions stored within the at least one computer readable product configured for:

after a first bridge is turned on for the first time or reset to factory default settings, (i) automatically searching for a second bridge to associate with the first bridge, (ii) automatically associating the first bridge with the second bridge when the second bridge is found, and (iii) automatically displaying one or more indicators associated with the first bridge which indicate a signal strength of one or more signals received by the first bridge from the second bridge when the second bridge is associated with first bridge.

37. A computer program product as recited in claim 36, wherein the searching, associating, and displaying operations (i) through (iii) are automatically performed without any configurations being set up by a user.

38. A computer program product as recited in claim 36, wherein the searching includes:

searching for a master for a predetermined time period; and when a master is not found after the predetermined time period, sending periodic beacons on a selected channel so that a slave can associate with the first bridge, wherein each beacon indicates that the first bridge is being defined as a master.

39. A computer program product as recited in claim 38, wherein the one or more indicators display the signal strength of the signal received from the found master after the master is found or display the signal strength of the signal received by the first bridge from a slave that has associated with the first bridge.

40. A computer program product as recited in claim 38, the computer program instructions stored within the at least one computer readable product being further configured for associating the first bridge with the found master when a master is found.

41. A computer program product as recited in claim 36, wherein the signal strength is indicated by being displayed audibly by the one or more indicators associated with the first bridge.

42. A computer program product as recited in claim 36, wherein the signal strength is indicated by being displayed visually by the one or more indicators.

43. A computer program product as recited in claim 42, wherein the one or more indicators include one or more light emitting devices coupled to the first bridge.

44. A computer program product as recited in claim 42, wherein a different visual mode is displayed on a plurality of indicators for different signal strength value ranges and the different visual modes include different combinations of at least (i) displaying a steady color, (i) displaying a slow blinking color, and (ii) displaying a fast blinking color.

45. A computer program product as recited in claim 42, wherein a different visual mode is displayed on a plurality of indicators for different signal strength value ranges and the different visual modes include different combinations of at least (i) displaying a steady color, (ii) displaying a very slow blinking color (iii) displaying a slow blinking color, and (iv) displaying a fast blinking color.

46. A computer program product as recited in claim 36, wherein the indicated signal strength is an average signal strength over a specified time period.

47. A computer program product as recited in claim 38, wherein searching for a master is only performed when the first bridge is not preconfigured as a master, and wherein when the first bridge is preconfigured as a master, periodic beacons are sent on a selected channel so that a slave can associate with the first bridge without waiting until after the predetermined time period for finding a master.

48. A computer program product as recited in claim 36, the computer program instructions stored within the at least one computer readable product being further configured for:

obtaining and storing a plurality of received signal strength values of signals sent by the second bridge to the first bridge, wherein the indicated signal strength is an average of the plurality of received signal strengths.

49. A computer program product as recited in claim 36, wherein the indicated signal strength is displayed until an installation mode of the first bridge completes.

50. A computer program product as recited in claim 36, wherein the indicated signal strength is displayed until optimum indicated signal strength is reached.

51. A computer program product as recited in claim 49, the computer program instructions stored within the at least one computer readable product being further configured for preventing the passing of traffic through the bridge unit the installation mode is exited.

52. An apparatus for installing or aligning a bridge for facilitating communication between nodes in a wireless computer network, comprising:

means for after a first bridge is turned on for the first time or reset to factory default settings, (i) automatically searching for a second bridge to associate with the first bridge, (ii) automatically associating the first bridge with the second bridge when the second bridge is found, and (iii) automatically displaying one or more indicators associated with the first bridge which indicate a signal strength of one or more signals received by the first bridge from the second bridge when the second bridge is associated with first bridge.

53. An apparatus as recited in claim 52, wherein the searching, associating, and displaying operations (i) through (iii) are automatically performed without any configurations being set up by a user.

54. An apparatus as recited in claim 52, wherein the searching includes:
- searching for a master for a predetermined time period; and
- when a master is not found after the predetermined time period, sending periodic beacons on a selected channel so that a slave can associate with the first bridge, wherein each beacon indicates that the first bridge is being defined as a master.

55. An apparatus as recited in claim 54, wherein the one or more indicators display the signal strength of the signal sent from the found master after the master is found or display the signal strength of the signal sent to the first bridge from a slave that has associated with the first bridge.

* * * * *